May 29, 1956 MOTOHARU KURATA 2,747,280
APPARATUS FOR AUTOMATICALLY CUTTING GLASS SHEETS
Filed Jan. 5, 1953 3 Sheets-Sheet 1

INVENTOR.
Motoharu Kurata
BY Richard J. Geier
ATTORNEYS

INVENTOR.
Motoharu Kurata
BY
ATTORNEYS

May 29, 1956  MOTOHARU KURATA  2,747,280
APPARATUS FOR AUTOMATICALLY CUTTING GLASS SHEETS
Filed Jan. 5, 1953  3 Sheets-Sheet 3
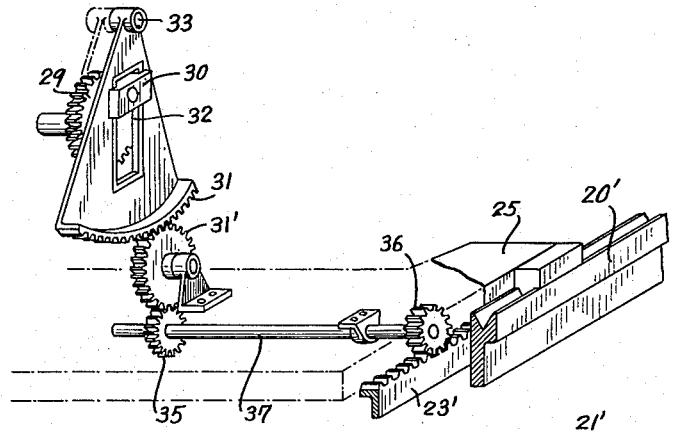
FIG.3.
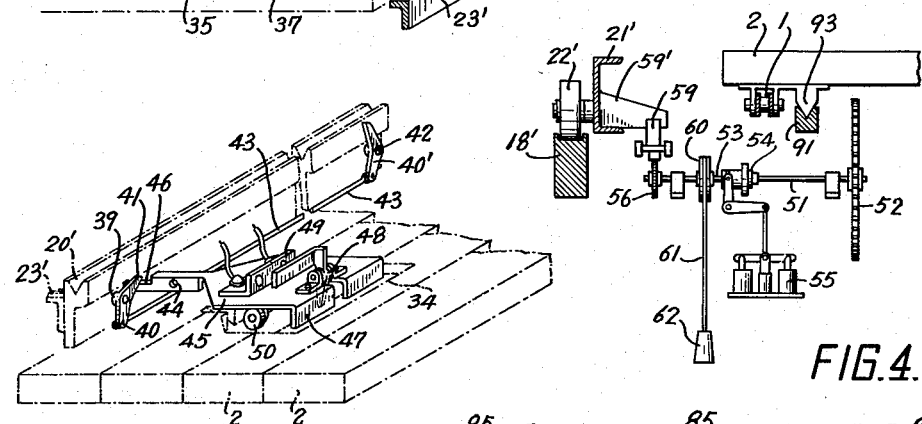
FIG.4.
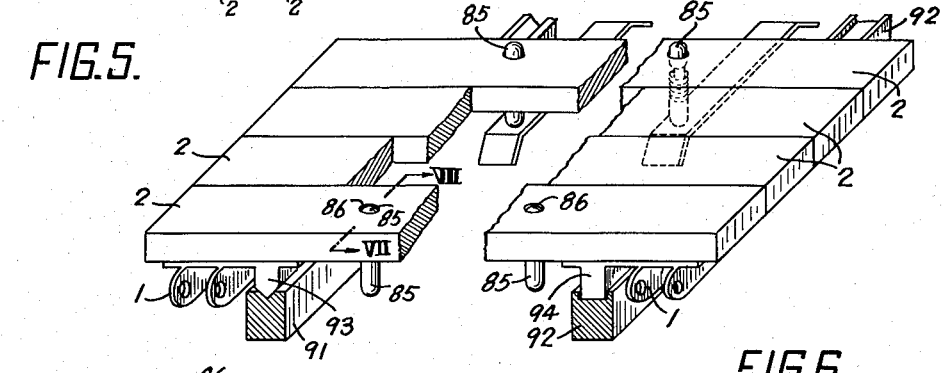
FIG.5.
FIG.6.
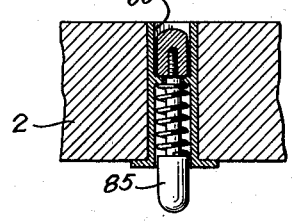
FIG.7.
INVENTOR.
Motoharu Kurata
BY Richard y Geier
ATTORNEYS

United States Patent Office 2,747,280
Patented May 29, 1956

2,747,280

APPARATUS FOR AUTOMATICALLY CUTTING GLASS SHEETS

Motoharu Kurata, Tokyo, Japan, assignor to Asahi Garasu Kabushiki Kaisha, Tokyo, Japan, a corporation of Japan Application January 5, 1953, Serial No. 329,503

9 Claims. (Cl. 33—32)

The present invention relates to an automatic glass cutting apparatus, particularly an apparatus for automatically cutting glass plates or sheets longitudinally and traversely, and has for its object the provision of an apparatus whereby the cut is made continuously on a glass plate to accurate sizes rapidly in high efficiency in longitudinal and traverse directions.

A further object of the invention consists in cutting glass plates continuously, without stopping the glass plates to be cut, and to predetermined sizes accurately.

Another object of the invention is to cut the glass plate longitudinally and traversely at high efficiency substantially without imparting shock to the cutting device.

Further objects, features and advantages of the present invention will be apparent from the detailed description following hereafter.

According to the present invention, a glass plate carried on a continuously travelling conveyor approaches the cutting position; a guide frame carrying a traverse cutting tool then starts the advancement first at lower speed in the same direction as that of the glass plate; and then proceeds at the same speed as that of the glass plate to be cut or of the conveyor, simultaneously the traverse cutting tool for glass descends and the traverse cutting tool crosses the glass plate to accomplish the traverse scoring operation. When the traverse cutting or scoring has been completed, the engagement of the scored glass plate or the conveyor with the guide frame is released, which causes stopping the movement of guide frame and at the same time to lift the cutting tool. The slide bed remains at its position or allowed to return in the original position, while the guide frame returns in the starting position.

Accordingly, the present invention provides an extremely efficient apparatus capable of carrying out traverse scoring without interrupting the travel of conveyor, and more particularly a longitudinal and traverse cutting of glass plates is carried out continuously at extremely high efficiency by a combination of a traverse scoring apparatus with a longitudinal scoring apparatus.

One embodiment of the present invention is illustrated as follows:

A conveyor is constituted by arranging one plane wood plate per one link of a conveyor chain. To the underside of the conveyor are attached slides which are fitted accurately in both grooves, respectively of the one guide having a V-groove held in exactly horizontal and of the other having a plane channel shaped groove. Thus, rolling of the conveyor is perfectly prevented, during the travel of conveyor. The total length of the conveyor is divided in several equal sections accurately, in each of which section one operation of loading glass plates, of traverse and longitudinal scoring or of trimming off is enabled. The said conveyor has stop pins respectively at predetermined positions thereof and numerous pin holes, through which said stop pins project, are provided at the predetermined positions of the wood plates forming the conveyor, and also a recess capable of engaging and disengaging with an engaging lever pivoted to the front portion of guide frame carrying the traverse cutting device.

The traverse or cross cutting device according to the present invention is provided on a slide bed which is in conformity with a pair of guide rails bridged over the conveyor at right angle to the line of travel of said conveyor. Further, on both or either one sides of bed, a support or carrier for a cutting tool for the cross cutting or scoring of glass plates is provided. One or a few of cross cutting tools adapted for changing their positions freely and for moving up and down, is or are provided in said support. Besides, an electric motor is also located on said bed.

Glass sheets are always loaded on a fixed position of the conveyor by the operation of glass plate loading device, and proceed to the traverse cutting position. Thus, the engaging lever falls into the recess, bringing first the swing piece into action and thereby the guide frame commences a slow movement in the same direction as that of the conveyor. A lug of the swing piece engages then with the rear edge of the recess and the guide frame is made to move forward by the action of an electrical mechanism at the same speed as that of the conveyor. At the same time, an electric motor for traverse cutting apparatus is actuated to move the bed on the guide rail, by the engagement established between racks provided along the side face of guide frame and pinions carried by the bed. In addition, there is provided a vertically moving device for glass cutting tool attached to the side of slide bed, which descends the cross cutting tool from the proper position on the advancement of slide, brings said tool in contact with the surface of glass plate at the predetermined position of conveyor and causes the cross cutting tool to make cross scoring. Thus, the operation of cross scoring is carried out automatically. As soon as the cross scoring operation is completed the engaging lever disengages the conveyor, the glass cutting tool returns to its upper or inoperative position; the guide frame returns to its starting position by being pulled backward under the action of the spring and counterweight, while a sector gear revolves reversely and the bed also returns to its starting position to stop the electric motor by means of a limit switch. In case the glass cutting tools are provided inevitably on both sides of the slide bed, the cross cutting tool provided on the one side is lowered on the advance stroke, and the traverse scoring operation is carried out in holding the cutter on the other side at high or inoperative position. On finishing the traverse or cross scoring operation, the electric motor is stopped and simultaneously the movement of bed is also stopped by a limit switch and the guide frame is returned to its starting position. During the next cross scoring operation, the motor for said operation is run by the limit switch and the bed is allowed to make the return travel by a reverse running of the sector gear. Then, the traverse scoring may be carried out with the tools on the opposite side of the bed. The glass plate thus scored traversely proceeds undisturbedly until it is finally subjected to the longitudinal scoring operation.

The longitudinal cutting tool holder is provided with several devices for glass-cutting tools capable of changing their positions freely and of moving up and down. By the movement of the conveyor, the glass-cutting tools having been held at elevated position by said devices are lowered from arbitrarily occupied positions, and said tools are brought in contact with the glass surface, which has been scored traversely, to make longitudinal scores. When the longitudinal scoring has been completed, the cutting tools are raised up to the original position. Then, the glass plates scored longitudinally and traversely are trimmed off along four edges or the front and rear edges only if necessary by means of a crack off device.

The foregoing description deals with a conveyor, wherein the conveyor being made endless, longitudinal and traverse scorings are conducted continuously, without stopping the travel of conveyor during the operation. However, it is of course possible to adopt usually known mechanism without departing from the spirit and scope of the invention, for the tool for the traverse cutting of glass provided on both sides of the bed or one side thereof, a mechanism wherein a guide frame is driven at the same speed as the glass plate to be cut or the conveyor, and other mechanism wherein the guide frame and the slide bed are moved to and fro, and so forth.

In order that the present invention may be more clearly understood, one embodiment thereof will now be described, by way of example, with reference to the accompanying drawings, in which:

Figs. 1a and 1b together constitute a side elevation of one embodiment of the assembled apparatus according to the invention;

Figs. 2a and 2b comprise a plan view thereof;

Fig. 3 is a perspective view of part of travelling mechanism of the slide bed on the guide frame;

Fig. 4 is a fragmentary view showing diagrammatically a device for starting and running slowly the guide frame;

Fig. 5 is a perspective view of a part illustrating the engagement between the conveyor and guide frame;

Fig. 6 is a sectional perspective view on the line VI—VI of Fig. 2, on an enlarged scale and Fig. 7 is a sectional view on the line VII—VII of Fig. 6.

Figure 1A:
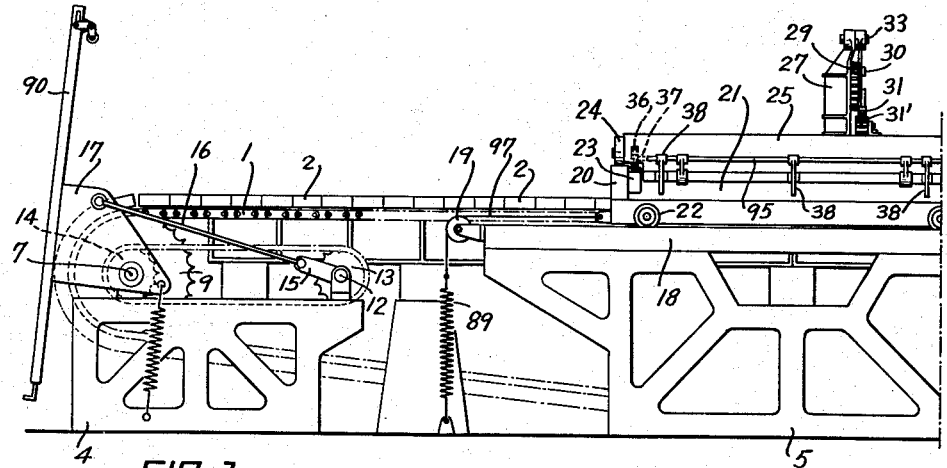
Figure 2A:
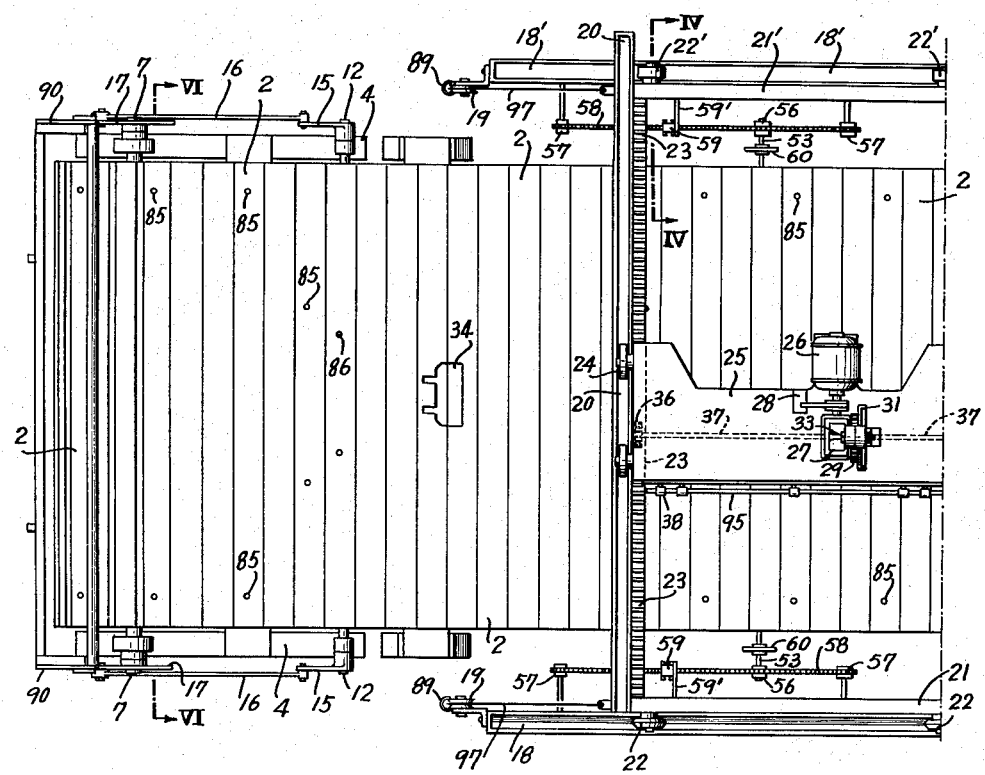
Figure 1B:
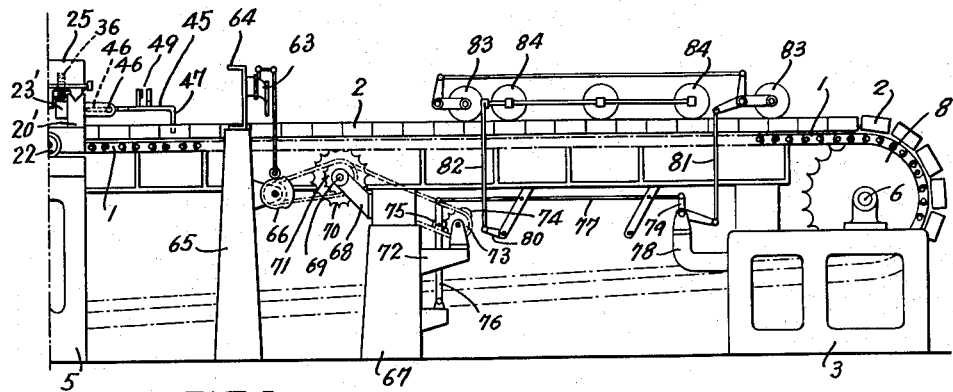
Figure 2B:
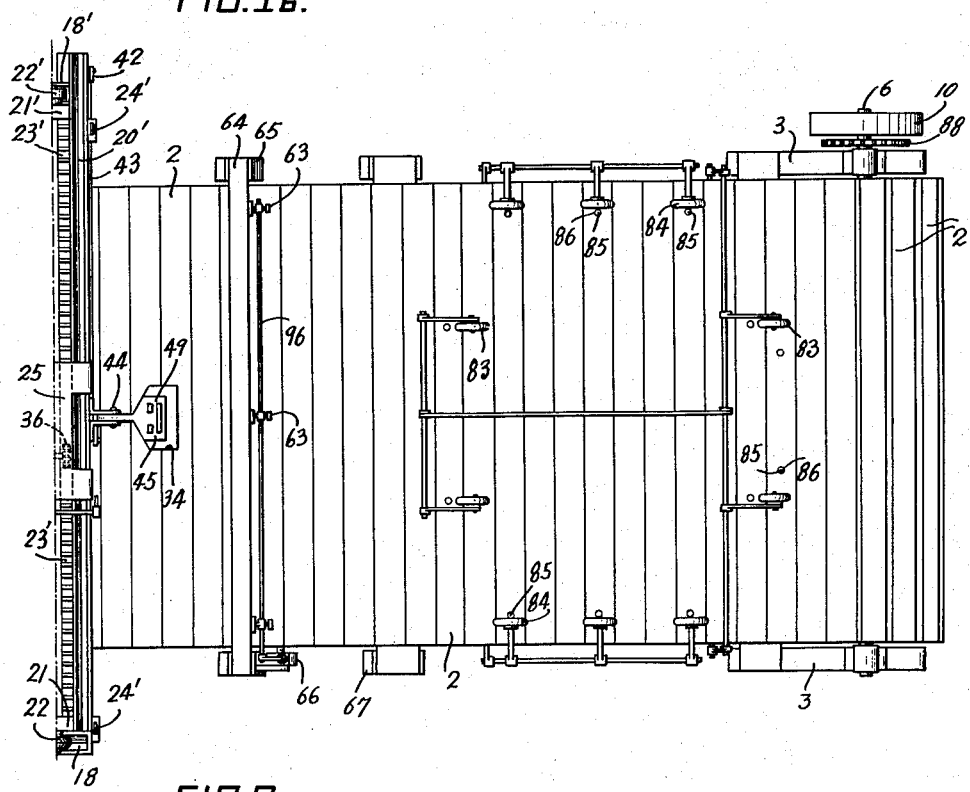

In the drawing, one flat wooden plate 2, or a conveyor plate for glass plate cutting, is secured to each link of an endless conveyor-chain to constitute a conveyor. Slides 93 and 94 are attached to the under-faces of conveyor-plates, which slides fit accurately in grooves of a pair of guides held accurately horizontally of two guides, one 91 having V-shaped groove and the other 92 having a plane channel shaped groove. Thus a straight forward movement is provided with the aid of said two guides while the rolling of conveyor during its travel is effectively prevented.

In each section of the conveyor, such as pin holes 86 are provided at desired position on the wooden plate 2 of the conveyor, which pin holes have pins 85 capable of up and down movement therein, those pins being designated to be hidden in the pin-holes ordinarily and projected from the surface of wooden plate at desired places, whenever needed.

The conveyor-chain 1 is passed around sprocket wheels 8 and 9 on the main shafts 6 and 7 journaled in suitable bearings carried by the frameworks 3 and 4 on both sides thereof. On one end of the main shaft 6 is also mounted a wheel 10 which is driven by an electric motor equipped with a reduction gear (not shown in the drawing).

In order to load a glass plate to be cut on the conveyor, a shaft 12 carrying chain wheels 13 is journaled in both ends of frame works 4 on both sides of the conveyor. Between chain wheels 14 mounted on both ends of a main shaft 7 and aforementioned chain wheels 13, chains are passed around, this shaft 12 being rotated through the intermediary of chains with the rotation of sprocket wheel 9. Cranks 15 are attached to both sides of aforementioned shaft 12 respectively. Connecting rods 16 are pivoted to the ends of cranks 15. Further, the other ends of these connecting rods 16 are also pivoted respectively to both fin shaped plates 17 projected on the back sides of tilting frames 90 for receiving glass plate and revolving around the main shaft 7. Thus, the fin shaped plates are made to swing in conjunction with a travel of the conveyor. The glass plate rested against the tilting frame 90 may be always transferred and loaded on the predetermined position of traveling conveyor.

As a traverse cutting or scoring device for glass plate, on each frame work 5 disposed on both sides of the conveyor are mounted respectively slides for guide frame 18 and 18', one of which is on the upper surface made a V-shaped groove and other of which is on the upper surface made a channel-shaped groove. Rollers 19 are respectively provided on the rear end of the slides 18 and 18'. A rectangular guide frame is arranged over these two slides, which guide frame is constituted of guide rails 20 and 20' connected with connecting members 21 and 21'. The guide rails are bridged across above the conveyor at right angle thereto and have slide faces on the top and rack bars 23 and 23' provided along each inner side of said guide rails. Then, any suitable number, e. g. two each in the drawing, of rollers of rhombic section 22 and drum rollers 22' are provided in addition outside of the connecting rods 21 and 21' which are so designed that the frame may be slided forwards and backwards in parallel to the conveyor by the rolling of the said rollers on the said slides 18 and 18'. Moreover, on the sides of guide rails 20 and 20' limit switches 24' are provided and a slide bridge bed 25 is bridged on the guide rails. Thus, the said bed 25 is capable of sliding forwards and backwards at right angle to the direction of the conveyor's travel on the guide rails 20 and 20' by means of rollers 24 attached to the rear end of said bed 25. Further, this slide bed 25 is equipped with a geared motor 26, and by means of its reduction gear 27 a gear wheel 29 is rotated. The said gear wheel provided with an eccentric pin 30 fitted in a longitudinal slot 32 of its sector gear wheel 31 is capable of swinging said sector gear wheel to the right and left around its axis 33. Thus, with the swing of said sector gear wheel, it rotates a gear wheel 31' in engagement with a gear wheel 35 secured to a shaft 37, on each end of which shaft is mounted with a pinion 36 meshing with racks 23 and 23' provided respectively on each inner side of the guide rails 20 and 20' at lower parts of both ends of the slide bed 25, whereby the slide bed 25 may be caused to slide laterally on the guide rails. When this slide bed 25 has completed one return motion, an electric motor 26 is stopped by a limit switch, or the motion of gear wheel mechanism may be disconnected by means of a clutch actuated by a magnetic switch instead of halting the electric motor. Besides, a support or carrier for glass cutting tool 95 secured to the end surface of both or either one side of said bed 25 is provided with a plurality of glass cutting tools for cross scoring 38, of which position is freely adjustable according to width of the glass plate to be cut, and adapted to make up and down movement.

As a driving device for the guide frame of traverse or cross scoring device, a turning piece 39 having two arms 40 and 41 is pivoted to the central portion of the front guide rail 20' and one arm 40 of the piece 39 is connected with one arm 40' of an impact piece 42 pivoted to one end portion of said rail 20' by means of a connecting rod 43, and whose other arm 41 is designed to engage with a reduced end portion 46 of an engaging lever 45 pivoted to the rail 20' through a pair of brackets with a pin 44. The front portion of this lever 45 is formed with two bent pieces 47 bending downwards. Further, on the said front end a swing piece, 48 is pivoted and its lower lug extends downwardly through a groove between the two bent pieces, and a starting switch 49 is made to be operated by the action of the upper lug of the swing piece. Besides, a pair of left and right small rollers 50 is provided inside of the bent piece 47.

As the driving device which actuates first the traverse scoring device, chain wheels 52 are positioned on both sides of the under side of the conveyor and these chain wheels are driven by a chain belt in conjunction with the travel of the conveyor (Fig. 4), the shaft 51 of which chain wheel 52 is connected with a shaft 53 by means of a clutch 54 actuated by a magnet 55. On the other end of said shaft 53 a small chain wheel 56 is further provided. The said chain wheel 56 drives an endless chain belt 58 passed over a pair of chain wheels 57 arranged inwardly aparting from the slide rests 18 and 18'. And said chain belt is provided with a feed pallet 59 which may be brought in engagement with a holding bar 59' projected respectively from the connecting member 21 of the slide frame. A chain belt 61 having at the bottom end a counterweight 62 is formed to engage with a chain wheel 60 mounted on aforementioned shaft 53 so as to aid the returning power of the endless belt 58. The longitudinal scoring device is constituted of a supporting rod 96 for glass cutting tools arranged in front of supporting frame 64 bridged across above the conveyor on each cradle 65 on both sides of the conveyor and said supporting rod 96 carries a plurality of glass cutting tools 63 for longitudinal scoring, as in the case with the glass cutting tool for traverse scoring, capable of changing their position freely and of ascending and descending as well. A bracket 68 projected from the frame bed 67 carries a chain wheel 70 and a shaft 69 of the chain wheel 70 is rotated along with the rotation of the conveyor. Then, a cam wheel 66 is rotated intermedially with a chain belt passed over the other chain wheel 71 mounted on the said shaft 69. Thus, the glass cutting tool for longitudinal scoring 63 can be moved up and down.

Further, the glass plate which has been scored longitudinally and traversely with glass cutting tools for traverse and longitudinal scoring, may have cracked off automatically four edge portions on further advance of the conveyor, with a cracking off device. From the chain wheel 71 of said shaft 69, a chain wheel 73 carried by an elbow 72 of a frame bed 67 is rotated by a chain belt passed over these two wheels. Thus, a roller 75 secured to a swing rod 76, the bottom end of which is pivoted, is actuated by a cam 74 secured to the said shaft. Corresponding to the swing motion of a swing rod 76, one crank arm 79 pivoted to a bracket 78 of the frame work 3 and another crank arm 80, one end of which is pivoted to a lever which is pivoted at its one end to the aforementioned connecting rod 77, are simultaneously actuated by the intermediary with said connecting rod 77 connected with the upper end of said swing rod 76. In so arranging, by the action of connecting rods 81 and 82 pivoted respectively to each of crank arms 79 and 80, pressing down rollers 83 and 84 put pressure on the glass surface on the conveyor and at the same time the pins 85 are projected through pin holes 86 of the conveyor and thereby the edges of glass plate are cracked off along the scored lines which have been made by traverse and longitudinal scoring. By a chain wheel 88 carried on the main shaft 6 is driven a roller conveyor, which is constituted of a number of rollers connected with the above mentioned conveyor (not shown in the drawing). The glass plate thus trimmed off edges therearound may be further cut along the score at the middle on the way, after which the glass plate being fed to the packing section.

According to the present invention, the operation of slide bed carrying the traverse scoring device is carried out in the sequence as follows:

Before the glass plate enters into the traverse scoring position, the engaging lever 45 connected pivotally to the front part of guide frame 20' falls in the recess 34 of conveyor. When lower lug of swing piece 48 pivoted to the forehead of engaging lever 45 actuates the starting switch 49 to close said switch, the clutch 54 is brought to engage by the action of magnet 55 of the slow moving mechanism connected to the said switch. The shaft 51 of the chain wheel 52 driving continuously in engagement with travel of the conveyor on both sides therebeneath and the shaft 53 provided at the one end with the chain wheel 56 are operationally connected with one another, and then the latter shaft 53 sets in rotation. In consequence, the endless chain belt 58 in mesh connection with the chain wheel 56 carried on the said shaft 53 starts, thus the feed pallet 59 attached to the chain belt 58 sets in forward movement therewith. With a result, the holding rod 59' of the guide frame is pushed forward and the guide frame for traverse cutting by scoring commences its travel. The starting of guide frame being carried out by means of the said chain belt 58 together with the feed pallet 59 it may be accomplished without imparting considerable shock to the guide frame, the speed thereof being designed to be slower than that of the conveyor.

Thus, as the speed of the conveyor is slightly higher than that of the guide frame, the guide frame is capable of advancing with the conveyor by means of the said engaging lever, while a bent member 47 at the forehead of the engaging lever 45 projected on one side of the guide frame is kept in loose contact engagement with the rear edge portion of the recess 34 on the conveyor. Thereupon, the guide frame is brought to advance at the same speed as that of the conveyor and then the electric motor 26 is switched on and the slide bed 25 sets in motion through the intermediary of the transmission gears 31, 31', 35, 36 and 23'. Then, the glass cutting tool 38 descends for traverse cutting, while sliding on the guide frame, thereby traverse scoring being made across the glass plate. When the slide bed 25 reaches its extreme end after the glass sheet has been scored, the slide bed kicks down the switch 24', whereupon the motor 26 located on the slide bed is driven reversely and consequently the slide bed-moving device is also reversely operated by the reverse drive of the motor 26. By this reverse operation the slide bed is reversely driven, and returns to its position. Concurrently therewith and when the traverse cutting is completed a projecting piece provided on one side of the bed strikes against the arm of the impact piece 42, whereby the lower arm 40 of the turning piece 39 connected with the said impact piece 42 by connecting rod 43 is turned and at the same time the other upper arm 41 of said piece pushes down the reduced end portion of the engaging lever 45. Thus, the forehead of the engaging lever 45 is lifted upwards around the pivot 44 and the lever disengage the recess 34, but since the forehead portion of the lever 45 is quite heavy this forehead portion descends of its own weight, with the pin 44 serving as a fulcrum; thus the rollers 50 of lever 45 may roll on the surface of conveyor. A stretching cord 97 is connected with one end of a tension spring 89 through a roller 19 at the back end of both sides of the guide frame, and thereby the guide frame is brought back to the original position as soon as the engaging lever 45 is released from its engagement with the conveyor. And when the engaging lever 45 is raised upwards as described above, the switch 49 is opened and thus the clutch 54 is disengaged. As a result, the chain belt 61 wound up by the chain wheel 60 carried on the shaft 53 is rotated in the reverse direction by the action of the counter weight 62, which renders the said endless chain belt rotate to the original position. When the slide bed 25 reaches its extreme end after the glass sheet has been scored, and the slide bed 25 strikes against an arm of the impact piece 42, an upper arm 41 of the turning piece 39 is pushed down through the operation of the connecting rod 43, whereupon the reduced rear end 46 of the engaging lever 45 is pressed down by the action of the arm 41. When said reduced rear end 46 is pressed down the forehead portion of the engaging lever 45 is correspondingly raised. Thus, the forehead portion disengages or is released from the recess 34 of the conveyor. However, the forehead portion of the lever 45 drops down of its own weight while swinging around the pin 44, so that the roller 50 provided under side of the forehead portion rests on the surface of the moving conveyor and rolls thereon. Accordingly, the downwardly bent portion 47 of the forehead portion falls in the next recess 34 of the conveyor as the conveyor travels.

The motor 26 is started by the actuation of the starting switch 49 in the circuit of the motor 26 and in that case the switch 49 is actuated when the forehead portion of the engaging lever 45 drops into the recess 34 of the conveyor and the lower lug of the swing piece 48 engages the rear edge portion of the recess.

The glass plate after the traverse cutting operation has finished is conveyed under the longitudinal cutting device and subjected to the longitudinal cutting.

Further, in the hitherto known automatic glass plate cutting device, it is usual to stop the conveyor in the operation of the traverse cutting. In those devices for traverse cutting, wherein the conveyor is not required to stop during the traverse cutting operation, the glass cutting tool is moved obliquely across the glass plate to be cut at the same speed to that of the conveyor. In such a case, however, it is very difficult to keep the conveyor and cutting tool at equal speed. An accurate cutting is extremely difficult. In the present invention, however, an accurate cross cutting portion can be carried out due to the fact that the guide frame which slidably carries the slide bed provided with the cross cutting tools, is able to travel at the same speed as the conveyor carrying the glass sheet to be cut, when the desired cross cuts or scores are to be made. Consequently, an extremely accurate traverse cutting is enabled, a longitudinal and traverse cutting is possible at high efficiency and in accurate dimensions, without damage and abrasion, since the guide frame standing still is set in motion by the endless chain belt 58 and holding bar 59' first at low speed and then it is brought to engage on the way with the conveyor and finally to be subjected to the traverse cutting operation, wherein almost no shock is imparted to the guide frame neither in the starting nor as it comes in engagement with the conveyor.

The foregoing descriptions have been made in details with respect to one preferred embodiment of the present invention, but it is understood that this disclosure is for the purpose of illustration and that various omissions or changes in shape, proportion and arrangement of parts, as well as the substitution of equivalent elements for those, herein shown and described, may be made without departing from the spirit and the scope of the invention as set forth in the appended claims.

What I claim is:

1. In an automatic glass cutting apparatus, the combination which comprises a conveyor on which the glass sheet to be cut is loaded, said conveyor having a recess, a guide frame bridged across above said conveyor, a slide bed having side walls and so mounted as to be capable of making a forward and backward movement on said frame, a cross cutting or scoring device provided on at least one side wall of said bed, carrying any suitable number of glass cutting tools for cross cutting or scoring capable of changing the position freely as well as of ascending and descending, an engaging lever having a bent portion falling in said recess of the conveyor and bumping against the rear edge portion of said recess, and means connecting said lever with said guide frame.

2. In an automatic glass cutting apparatus, the combination which comprises a conveyor on which the glass sheet to be cut is loaded, said conveyor having formed therein a recess having a rear edge portion, a guide frame bridged across above said conveyor, a slide bed so mounted on the frame above said conveyor as to be capable of sliding forwards and backwards thereon, a cross cutting or scoring device provided on side walls of the bed, carrying any suitable number of glass cutting tools for cross cutting or scoring capable of changing the position freely as well as of ascending and descending, an engaging lever equipped with a bent member falling in the recess of the conveyor and bumping against the rear edge portion of said recess, and means including a reduction gear and a motor connected thereto for the lateral movement of the slide bed.

3. In an automatic glass cutting apparatus, the combination which comprises a conveyor on which the glass sheet is loaded, said conveyor having formed therein a recess having a rear edge portion, a guide frame bridged across above said conveyor, a slide bed so mounted on the frame over said conveyor as to be capable of sliding forwards and backwards thereon, a cross cutting or scoring device provided on side walls of the bed, carrying any suitable number of glass cutting tools for cross cutting capable of changing the position freely as well as of ascending and descending, an engaging lever equipped with a bent member falling in the recess of the conveyor and batting against the rear edge portion of said recess, means connecting said lever with said guide frame, means including a reduction gear and motor connected therewith for lateral movement of the slide bed, a slow moving mechanism for the guide frame, and a switch device connected with said mechanism and actuated by bump between said engaging lever and the rear edge portion of the recess of the conveyor.

4. In an automatic glass cutting apparatus, the combination which comprises a conveyor on which the glass sheet is loaded, said conveyor having formed therein a recess having a rear edge portion, a guide frame bridged across above said conveyor, a slide bed so mounted on the frame over said conveyor as to be capable of sliding forwards and backwards thereon, a cross cutting or scoring device provided on side walls of the bed, carrying any suitable number of glass cutting tools for cross cutting capable of changing the position freely as well as of ascending and descending, an engaging lever equipped with a bent member falling in the recess of the conveyor and batting against the rear edge portion of said recess, means connecting said lever with said guide frame, means including a reduction gear and a motor connected therewith for lateral movement of the slide bed, a slow moving mechanism for said guide frame connected with a switching device actuated by bump between said engaging lever and the rear edge portion of the recess of the conveyor and a means in which, when said guide frame and slide bed are advancing at the same speed, aforesaid cross cutting device is enabled to make a cross cutting or scoring operation and means operative after said operation is completed for disengaging said engaging lever from the recess of the conveyor for returning the guide frame to the original inoperative position.

5. An automatic glass cutting apparatus, comprising a front guide rail, a turning piece having two arms pivoted to the front end face of said front guide rail, a connecting rod, an impact piece pivoted to one end of said rail and having an arm, one of the arms of said turning piece being connected by said connecting rod with said arm of the impact piece, a pair of brackets, a pin, an engaging lever pivoted between said pair of brackets by said pin and having a reduced rear end portion, the other arm of the turning piece being brought to engagement with said reduced rear end portion of the engaging lever, a swing piece pivoted on the front end of said lever and comprising a lug, a starting switch adapted to be operated by said lug of the swing piece, a slide bed, a cross cutting and scoring device carried by said slide bed, and a transmission mechanism actuating said slide bed, whereby said slide bed is actuated by said starting switch.

6. In an apparatus for automatically cutting glass sheets, in which glass sheets carried on a continuously travelling conveyor are transversely cut or scored by a cross cutting device driven at the same speed as that of the conveyor, without stopping said conveyor; guide rails which are bridged across over the conveyor, a slide bed equipped with the cross cutting device upon said guide rails and carrying glass cutting tools, a turning piece pivoted to the front end face of said guide rail, an engaging lever comprising a rear end portion which is adapted to engage with one arm of said turning piece, and a forehead portion which is formed at its front edge with a downwardly bent portion, a pivoted swing piece and starting switch mechanism mounted on said forehead portion, said conveyor having a recess therein in which recess said lever may fall, a slow moving device which is adapted to start slowly by the action of the said swing piece and switch mechanism when the bent portion of the engaging lever falls into said recess as the conveyor travels and is driven at lower speed than that of the conveyor, and means causing the guide rails and the conveyor to advance at the same speed under engagement of the bent portion of the engaging lever with the rear edge portion of the recess of the conveyor.

7. In an apparatus for automatically cutting glass sheets, in which glass sheets carried on a continuously travelling conveyor are transversely cut or scored by a cross cutting device driven at the same speed as that of the conveyor, without stopping said conveyor; guide rails which are bridged across over the conveyor, a slide bed equipped with the cross cutting device and carrying glass cutting tools to proceed on said rails, a turning piece pivoted to the front end face of said guide rail, an engaging lever comprising a rear end portion which is adapted to engage with one arm of said turning piece and a forehead portion which is formed at its front edge with a downwardly bent portion, a pivoted swing piece and starting switch mechanism mounted on said forehead portion, said conveyor having a recess formed therein, in which recess said lever may fall, a slow moving device which is adapted to start slowly by the action of the said swing piece and switch mechanism when the bent portion of the engaging lever falls into said recess as the conveyor travels and is driven at lower speed than that of the conveyor, means causing the guide rails and the conveyor to advance at the same speed under engagement of the bent portion of the engaging lever with the rear edge portion of the recess of the conveyor, and means for making cross cuts or scores in the glass sheet on the conveyor by means of the cutting tools of the cross cutting device when the guide rail and the conveyor travel at the same speed.

8. In an apparatus for automatically cutting glass sheets in which glass sheets carried on a continuously traveling conveyor are transversely cut or scored by the cross cutting device driven at the same speed as that of the conveyor, without stopping said conveyor; guide rails which are bridged across over the conveyor, a slide bed equipped with the cross cutting device and carrying glass cutting tools to proceed on said rails, a turning piece pivoted to the front end face of said guide rail, an engaging lever comprising a rear end portion which is adapted to engage with one arm of said turning piece, and a forehead portion which is formed at its front edge with a downwardly bent portion, a pivoted swing piece and a starting switch mechanism mounted on said forehead portion, said conveyor having a recess formed therein, in which recess said lever may fall, a slow moving device which is adapted to start slowly by the action of the said swing piece and switch mechanism when the bent portion of the engaging lever falls into said recess as the conveyor travels and is driven at lower speed than that of the conveyor, means causing the guide rails and the conveyor to advance at the same speed under engagement of the bent portion of the engaging lever with the rear edge of the recess of the conveyor, means for making cross cuts or scores in the glass sheet on the conveyor by means of the cutting tools of the cross cutting device when the guide rail and the conveyor travel at the same speed, means including said turning piece having a plurality of associated members for disengaging the engaging lever from the recess of the conveyor after the cross cutting operation is completed, and a return device for returning the guide rails to their original position after the cross cutting has been made and said bent portion disengage from the recess of the conveyor.

9. In an apparatus for automatically cutting glass sheets in which glass sheets carried on a continuously traveling conveyor are transversely cut or scored by the cross cutting device driven at the same speed as that of the conveyor without stopping said conveyor; a guide frame having a front guide rail, an engaging lever which is longitudinally pivoted at its one end to the front end face of said rail and connecting members connected thereto, a switch mechanism carried by said lever, a slow moving apparatus which comprises a magnet connected with said switch mechanism, a clutch actuated by said magnet, a shaft, a chain wheel upon said shaft, another shaft, another chain wheel carried by said other shaft, means disengagingly connecting the first-mentioned shaft with said other shaft through the medium of said clutch, an endless chain belt having a feed pallet which passes over said other chain wheel, and holding bars projected respectively from the connecting members of the guide frame.

References Cited in the file of this patent

UNITED STATES PATENTS

| | | |
|---|---|---|
| 1,538,086 | Buttress | May 19, 1925 |
| 1,785,496 | Rowley | Dec. 16, 1930 |
| 1,882,325 | Kendall et al. | Oct. 11, 1932 |
| 1,924,162 | Mason | Aug. 29, 1933 |
| 1,999,593 | Owen | Apr. 30, 1935 |
| 2,033,188 | Drake | Mar. 10, 1936 |
| 2,158,900 | Goffaux | May 16, 1939 |
| 2,159,282 | Marino | May 23, 1939 |
| 2,406,889 | Mitchell | Sept. 3, 1946 |
| 2,489,712 | Kelly | Nov. 29, 1949 |